March 21, 1944.                R. T. BOWLING                  2,344,488
                    METHOD OF FORMING COMPOSITE BOARDS
                       Filed Jan. 13, 1941        2 Sheets-Sheet 1
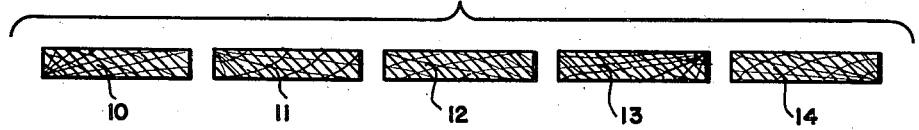
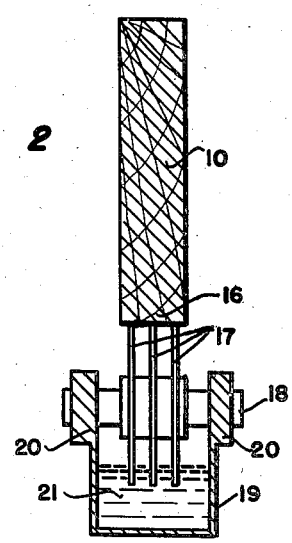
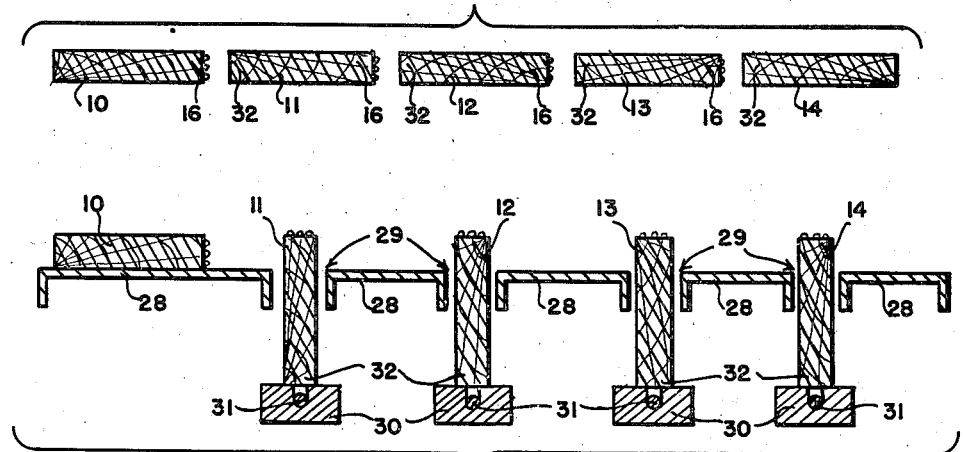
ROBERT T. BOWLING
INVENTOR
BY Herbert E. Smith
ATTORNEY March 21, 1944. R. T. BOWLING 2,344,488
METHOD OF FORMING COMPOSITE BOARDS
Filed Jan. 13, 1941 2 Sheets-Sheet 2
FIG. 5
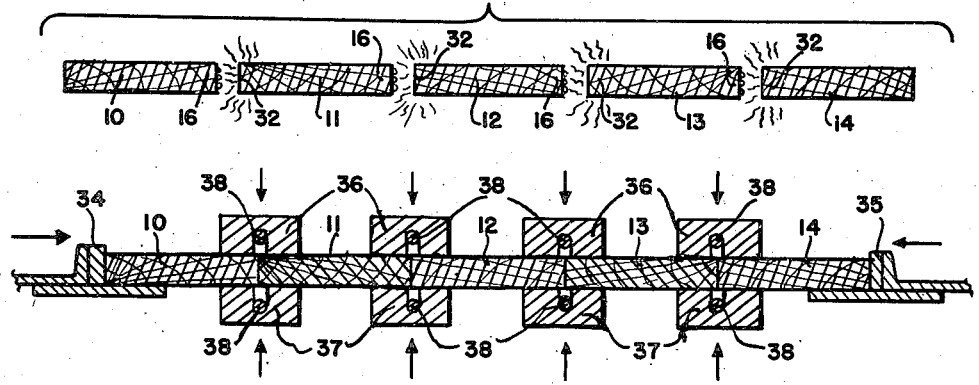
FIG. 6
FIG. 7
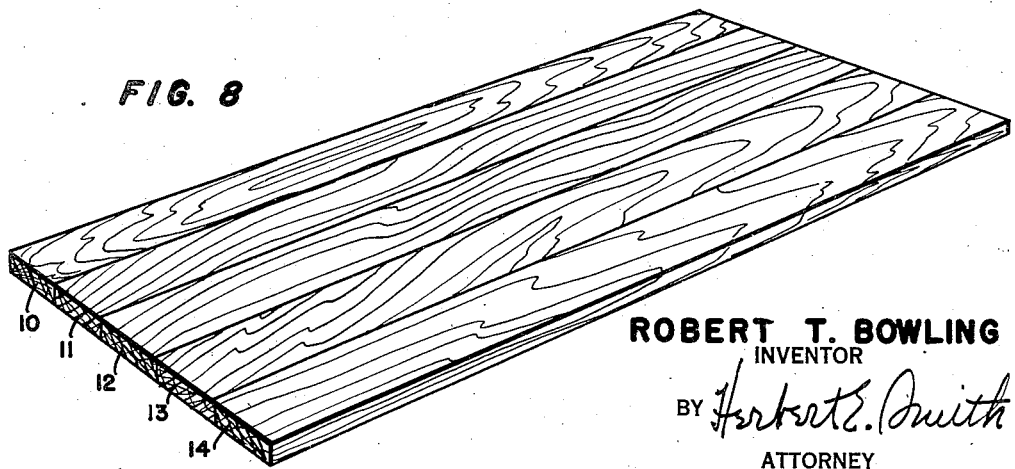
FIG. 8
ROBERT T. BOWLING
INVENTOR
BY *Herbert E. Smith*
ATTORNEY Patented Mar. 21, 1944

2,344,488

UNITED STATES PATENT OFFICE 2,344,488

METHOD OF FORMING COMPOSITE BOARDS

Robert T. Bowling, Lewiston, Idaho, assignor to Potlatch Forests, Inc., Lewiston, Idaho Application January 13, 1941, Serial No. 374,231

2 Claims. (Cl. 144—309)

This invention relates to an improved method of forming composite boards, wherein a plurality of boards are joined together side by side to form a unitary panel.

In lumbering operations, and in the subsequent milling of the lumber, there often occurs the production of lumber that is narrow in width or short in length and yet is relatively free from knots, blemishes or other value detracting conditions and would be suitable for many uses in larger sizes. Because of the narrowness or shortness boards of this nature do not command a market price commensurate with the grain condition or other factors that they possess. The market value for full dimension boards of the same degree of clearness or of grain condition is often several times greater than the shorter or narrower boards can command. This presents the problem of effecting a conversion of such boards into desirable sizes whereby the value of such board may be increased.

It has, therefore, been a prime object of my invention to provide an efficient speedy method of joining short or narrow boards to form a larger composite board.

Another object of my invention has been to provide a method of joining short or narrow boards to form a composite board having a thickness equal to any one board while in width or length, as the case may be, the composite board will comprise a plurality of boards joined in edgewise abutting relation.

A further object of my invention has been to provide a method of forming composite boards, wherein the components are of standard shapes and dimensions that result from a conventional wood milling operation and made available without the necessity of special mill practices.

Still another object of my invention has been to incorporate in my method the use of high speed glue applicators of heat and pressure so that my method may be practiced with rapidity and thus produce a high rate of production, at a minimum cost.

Other objects and advantages of my invention will be apparent from the following description wherein I have set forth the various steps of my method. While certain specific details of machinery may be described, it is to be understood that that description is solely for the purpose of illustration and is not to be construed as a limitation of the invention beyond those that may appear in the subjoined claims.

In the drawings—

Figure 1 is an end view of a set or quantity of prepared boards that are to be joined to form a composite board according to the principles of my invention, Figure 2 illustrates schematically the step of applying a liquid or fluid adhesive to an edge of a prepared board, Figure 3 illustrates a set comprising a plurality of adhesive-prepared boards aligned and ready for joining, Figure 4 illustrates a preheating step employed in my method preliminary to joining the individual members to form a composite board, Figure 5 is an end view that shows the effect of preheating a board, Figure 6 illustrates the step in my method wherein the individual members are aligned and arranged according to a pattern for the final joinder step, Figure 7 shows the manner in which pressure and heat is applied to boards arranged as shown in Figure 6 to effect the ultimate joinder of a unitary composite board, and Figure 8 is a perspective view of a finished composite board formed according to my novel method.

An initial step in preparing for the production of a composite board, of the nature shown in Figure 8, is to cut and prepare a plurality or set of boards referred to by numerals of reference 10, 11, 12, 13 and 14. The edges are cut and planed, preferably to present a true, smooth face at right angles to the cross axis of the boards. In certain instances these edges may be beveled or angularly cut with reference to the board's lateral axis. In that event the boards of a group to be joined will all be provided with matching edges. In the finished composite board according to this description the set of boards 10, 11, 12, 13 and 14 will be joined in the order indicated in Figure 1 in an edge-abutting or side-by-side manner.

A subsequent step in my method is the application of an adhesive, preferably a fluid glue to the edge of certain boards. A very satisfactory application of glue may be accomplished by the apparatus indicated in Figure 2. An edge 16 of each board 10, 11, 12 and 13 is caused to pass over a roller device comprising a plurality of discs 17 which are mounted on shaft 18 for rotation. A vat 19 supports the shaft 18 in journals 20, 20 and encloses a quantity of fluid glue 21. The lower edges of the discs 17 are partially immersed in the glue. As a board is passed over the discs, they will be caused to roll and pick up glue from the vat and to deposit it on the edge 16 of the board. In this example, three parallel leads or strings of glue 23, 24 and 25 will be deposited although more or less may be used as occasion will require.

I have found that my method may be very satisfactorily practiced by applying the glue some time previous to the final joinder step. This prior application of adhesive may be performed minutes, hours, or days before it is to be employed as an adhesive. In that event the glue may become hard and dehydrated but it will not affect the final results.

Glue will ordinarily, in a five unit composite board, be applied to an edge of only boards 10, 11, 12, and 13. Board 14 need have no glue as only one edge of an abutting joint need carry glue, and the edges 16 of board 13 will carry the glue or other adhesive for the joint between boards 13 and 14.

Another step in my method comprises the heating of an edge of certain boards of a set. In the final joinder of paired boards, an adhesive provided edge is preferably caused to abut against a preheated edge to facilitate the action of the adhesive. A suitable apparatus for preheating board edges is one which I have devised which is essentially a table comprising spaced apart table-top sections 28 which provide longitudinal slots 29. Aligned with and below the slots 29 are heater blocks 30 having heater elements 31 disposed in the upper faces of the blocks. In composite boards wherein five units are joined only boards 11, 12, 13, and 14 need have an edge as 32 heated since there are only four joints. During the gluing operation the board 10 of the set may be disposed on the table surface since it is advisable to initially assort and arrange the units ultimately to be joined and then to process them as a group or set throughout the various steps of my method.

The edges 32 of the boards will be permitted to rest adjacent the heater elements long enough for the wood to absorb heat for some distance in from the edge as I have indicated in Figures 5 and 6.

In the final stages of my method the boards of a set are subjected to side pressure and simultaneously to top and bottom pressure along the edges of the boards close to the joints. Side pressure rails 34 and 35 are caused to engage the outer edge of boards 10 and 14 and to close against each other and to bring the abutting edges of individual boards of the set together. Simultaneously the boards may be pressed on each side, top and bottom, by upper pressure bars 36 and lower pressure bars 37. The pressure applied by the rails 34 and 35 and by bars 36 and 37 in closing is indicated by the arrows in Figure 7.

When the boards are closed together and preheated boards are used, the heated edges 32 radiate heat upon the adhesive applied to edges 16 and tend to make the board on which it is supplied more receptive to gluing. In this way heat is applied in the center of the joint and facilitates and speeds up the gluing operation. The heat also prepares the adhesive for rapid and effective spreading in the joint.

I also prefer to provide the pressure bars 36 and 37 with heater elements 38 similar to elements 31 in blocks 30. In that arrangement, simultaneous with the application of top and bottom pressure to the boards of a set, heat is applied to the joints to assist in the gluing operations. The elements 38 may be placed in grooves in the pressing faces of bars 36 and 37 in such a manner as will not mar the board faces or interfere with the pressure application.

In the practice of my method I have been able to produce composite boards at 90 second intervals. A preferable characteristic of a suitable glue is that it be capable of rapidly drying or setting in the joint between boards. Thus, when an adhesive-carrying board is presented to another board at a joint and the two pressed together, the adhesive will readily flow and set in the joint.

Having thus described my invention, I claim:

1. The method of making a composite board which includes applying an adhesive to a lateral edge of one board, preheating a lateral edge of another board, assembling these boards with their treated edges in contact to form a joint, supporting the boards in horizontal position, applying lateral pressure against the assembled boards, simultaneously applying vertical pressure on the tops of the boards at their joint-edges, and confining and applying heat only to the upper and lower faces of the boards at the joint.

2. The method of making a composite board which consists in applying adhesive to the inner lateral edge of one outside board, preheating the inner lateral edge of the other outside board, successively applying an adhesive to one lateral edge and preheating the opposite edge of each of the intermediate boards, assembling the boards and supporting them in horizontal position to form joints between abutting treated edges, applying lateral pressure against the assembled boards, simultaneously applying vertical pressure against the boards and separately confining and applying heat only at the upper and lower faces of the boards at the joints.

ROBERT T. BOWLING.